United States Patent Office 3,466,207
Patented Sept. 9, 1969

3,466,207
TREATMENT OF METALS FOR PROMOTING ADHESION OF POLYOLEFINS
Gerald G. Vincent, Addison, Ill., and Frank L. Saunders, Midland, Mich., assignors to The Dow Chemical Company, Midland, Mich., a corporation of Delaware
No Drawing. Continuation-in-part of applications Ser. No. 378,972 and Ser. No. 378,996, June 29, 1964. This application July 19, 1967, Ser. No. 654,373
Int. Cl. C23f 7/00; B44d
U.S. Cl. 156—3                  14 Claims

ABSTRACT OF THE DISCLOSURE

Bonding of organic plastic coatings and laminar layers to surfaces of base metals is improved by treating the metal surface with aqueous solution of aliphatic carboxylic acid, drying the surface, and applying the organic plastic to the so-treated metal surface with heat and pressure. Optionally, the starting metal surface is first treated with aqueous inorganic acid solution containing hexavalent chromium and rinsed with water before the essential treatment with aqueous carboxylic acid solution. Strongly adherent bonds between organic plastic and base metal are obtained.

---

This application is a continuation-in-part of applicants' copending applications, Ser. Nos. 378,972 and 378,996 filed June 29, 1964, now abandoned.

This invention relates to adhering organic plastic materials to metal substrates. More particularly, it relates to improvements in the surface treatment of metal substrates whereby organic plastic materials are made to adhere to said metal substrate with improved adhesive bond strength.

Various methods for increasing adhesion of plastic coatings to metal substrates have been proposed. Adhesion promoting agents such as polyalkylenimines or monolayers or organic acids have been employed to coat metal substrates before applying the plastic material. Attempts have been made to improve plastic adhesion to metal substrates by blending chromates into the plastic material or by coating the plastic material with chromates. However, laminated articles produced by the above methods have not been satisfactory due to insufficient retention of the adhesive bond between the polymer and the metal. For example, where laminated products are used to protect objects from outdoor weathering, prolonged exposure to water or moisture usually weakens the polymer-to-metal adhesive bond.

It is therefore an object to provide an improved process whereby organic plastic materials are adhered to treated metal surfaces. It is still another object to provide a process whereby laminated articles of superior bond strength are produced. A more specific object is to provide a process for treating metal surfaces whereby olefin polymers are made to adhere to said treated surfaces to provide a strong adhesive bond. These and other objects, advantages, features and variations will become apparent from the following description.

In accordance wtih the present invention, the above and other objects are attained by exposing a metal surface to an aqueous solution of an aliphatic carboxylic acid and subsequently drying the treated surface as essential steps in the process of preparing the metal surface for bonding plastics thereto. Optionally, and sometimes with further advantage, the starting metal surface is first treated with an aqueous inorganic acid solution containing hexavalent chromium, subsequently followed by the aforementioned steps of treating the metal surface with the aqueous solution of aliphatic carboxylic acid and drying the so-treated metal surface.

The resulting treated metal surface has improved propensity for adhesion to polymeric plastic materials and to the formation of strong adhesive bonds therewith in the fabrication of coated and laminated articles. For example, a laminated article having strong inter-laminar bond strength is made by placing a thermoplastic polymer film on a treated dry metal surface and subjecting the assembly to heat and pressure.

In one embodiment of the present invention a metal such as aluminum is placed in an aqueous aliphatic carboxylic acid solution at elevated temperatures, said solution containing, for example, maleic acid. The treated metal is rinsed with water and dried. A thermoplastic film such as polyethylene is bonded to the treated metal by subjecting the resulting lay-up to temperatures of from about 140° C. to about 210° C. and preferably from about 160° C. to about 200° C. and pressures sufficient to obtain a strong adhesive bond.

In another embodiment of this invention a metal such as aluminum is placed in an aqueous inorganic acid solution at elevated temperatures, said solution containing hexavalent chromium, such as chromium trioxide. The treated metal is rinsed with water and placed in a second solution containing an aliphatic carboxylic acid such as maleic acid, rinsed again and then dried. A thermoplastic film such as polyethylene is bonded to the treated metal by subjecting the resulting lay-up to temperatures of from about 140° C. to about 210° C. and preferably from about 160° C. to about 200° C. and pressures sufficient to obtain a strong adhesive bond.

Any of the common base metals and alloys normally used for structural purposes and subject to bonding to organic plastics can be used as substrates in the practice of this invention. Representative illustrations of such metals are iron, copper, zinc, aluminum, magnesium, tin, nickel, silver, lead; alloys thereof such as brass, various bronzes, steel, and the like; plates such as tin-plate, terne-plate, galvanized iron and the like; and various composite structures of two or more of these materials.

Aliphatic carboxylic acids suitable for the practice of this invention are mono- and polycarboxylic acids which are soluble in water at least to the extent of about 0.1 percent by weight at the temperature of use and are illustrated by maleic, citraconic, acrylic, polyacrylic, fumaric, methacrylic, polymethacrylic, crotonic, glutaric, itaconic, maleamic, and the like. While some of these aliphatic carboxylic acids are ethylenically unsaturated, the unsaturation as such is not a requisite and does not enter into the functional behavior of these acids in this case; this is evidenced by the operability herein of carboxylic acids which have no such unsaturation at the point of use, such as polyacrylic acid and glutaric acid. Mixtures of two or more of the acids can be used. As hereinbefore indicated, the aliphatic carboxylic acids are used in the form of aqueous solutions thereof.

When used in a first treating step, the aqueous inorganic acid solution contains hexavalent chromium. The preferred solution is one of chromium trioxide, but may also contain other inorganic acids such as phosphoric acid.

Useful concentrations of each of the above aqueous solutions are in the range from about 0.1 percent to about 50 percent by weight (or up to the solubility limit) and preferably about 5 percent by weight of the acid ingredient based on the total weight of the solution. The hexavalent chromium acid solution is calculated as $CrO_3$. Temperatures of the inorganic acid solution during the metal treating step are usually at least about 40° C., e.g. in the range from about 40° C. to about 100° C. and preferably from about 70° C. to about 90° C. The temperature of the organic acid solution should be at least about 40° C. and preferably above 60° C., up to about 100° C., preferably up to about 90° C.

When the inorganic acid solution containing hexavalent chromium is used in the optional first treating step, it is usually desirable to rinse with water the treated metal resulting from that step to remove therefrom any clinging treating solution before transferring the metal to the carboxylic acid treating step in order to minimize contamination of the carboxylic acid treating solution. It is not necessary to dry the metal between the inorganic acid treatment and the carboxylic acid treatment, but the metal may be dried if desired.

After the step of treating the metal in the aqueous aliphatic carboxylic acid solution, it is also desirable, but not essential, to rinse the metal surface with water. It is, however, essential to dry the treated metal before applying thereto the organic plastic material.

Apparatus and procedures for carrying out the aforementioned operations of preparing, handling and maintaining the aqueous treating solutions, exposing the starting metal articles thereto, rinsing and drying the treated metal, etc. are well known to the artisan.

Thermoplastic materials useful in bonding to metal surfaces treated in accordance with the present invention include polymers of olefins such as high and low density polyethylene, polypropylene, poly(butene-1), copolymers of ethylene and propylene, blends of polymers of ethylene and the like. Coatings can be applied by conventional means such as extrusion coating, as a film or powder, and be of any thickness which is suitable for the particular use. Filler materials such as carbon black may be mixed into the polymeric coating material to provide additional desirable properties. The addition of such fillers does not susbtantially interfere with the polymer to metal adhesion. Coatings and sheets of organic plastics can be used between facing laminae having treated metal surfaces.

The process of the present invention provides laminated articles with unusually high bond strength properties. The laminate may be used in making wire and cable products, pipelinings, adherent protective coatings for improved chemical and corrosion protection, structural adhesives, packaging materials, printed circuit boards and the like.

The following examples are illustrative of the present invention and are not intended to limit the scope thereof.

Examples 1–6 illustrate the invention where only the aliphatic carboxylic acid treating step is used. Examples 7–15 illustrate the invention where the optional step of treatment with aqueous inorganic acid solution containing hexavalent chromium is used.

Example 1

A 6 in. x 8 in. x 0.0045 in. piece of soft annealed pure aluminum foil was cleaned by immersing in boiling perchloroethylene for about 10 minutes. The cleaning step is not essential to the process but is included as a precaution to ensure a grease free surface. After cleaning, the aluminum foil was air dried for sufficient time to allow the perchloroethylene to evaporate. This foil was then immersed for 5 minutes in a solution made by hydrolyzing 50 gms. of maleic anhydride in 1 liter of water maintained at 80° C. After removing the metal foil from the immersion bath, the excess solution was rinsed off with deionized water and the metal foil was allowed to air dry at room temperatures. When water was no longer visible on the metal surface, the aluminum was considered sufficiently dry for bonding.

Fifteen grams of high density polyethylene of melt index 3.0 was compression molded into a film sheet in a hydraulic press under 110 p.s.i. and at a temperature of 160° C. for 2 minutes. The resulting polymer film was cooled in the press and thereafter removed, said film being approximately 0.01 inch in thickness. This film and the treated aluminum were placed together between poly(ethylene terephthalate) slip sheets and bonded in the press under a pressure of 110 p.s.i. and a temperature of 180° C. for 2 minutes. The polyethylene-aluminum laminate thus produced was tested for adhesion according to ASTM test D903–49 except that a cross-head separation rate of 4 inches per minute was used and the aluminum foil was peeled from the polymer. The peel strength measured by this test was 11.5 lbs. per inch of width.

As a comparative test, the peel strength of polyethylene bonded to aluminum foil of the same kind but not treated by the previously described process was only 0.5 lb. per inch of width when measured by the same test.

Example 2

Another method of measuring adhesion is by means of a lap shear test. Two pieces of aluminum 6 in. x 4 in. x 0.063 in. were treated in the manner described in Example 1. A polyethylene film was also prepared as described in Example 1. The two treated aluminum samples were overlapped ½ inch along their 4-inch width with the polyethylene film placed therebetween. The assembly was bonded in a hydraulic press for 2 minutes at a pressure of 60 p.s.i. and a temperature of 200° C. The lapped bond was then tested according to ASTM 1002–53T with an Instron testing machine. The lap shear strength of the adhesive bond was 2270 p.s.i.

In a comparative test, high density polyethylene film was bonded to aluminum treated with a solution containing sulfuric acid and sodium chromate. The lap shear strength was only 1459 p.s.i.

When, in another comparative test, high density polyethylene film was bonded to *untreated* aluminum, the resulting lap shear strength was effectively zero.

Example 3

A laminate sample was prepared according to the procedure described in Example 1. The laminate was placed in boiling water for about 16 hrs. to test the strength of the adhesive bond under such conditions. Before immersion in the boiling water, the laminate had a peel strength of about 19.0 lbs. per inch width. After 16 hrs. in the boiling water, the peel strength was 11.0 lbs. per inch width, i.e. more than 50 percent of the original bond strength was retained.

Example 4

The procedure of Example 1 was substantially repeated except that varying concentrations of maleic acid were employed. Table I shows that acid concentrations of up to about 50 percent by weight of maleic acid based on the total weight of the solution produces desirable adhesive bonds.

TABLE I

| Weight percent acid: | Peel strength lbs./in. width |
|---|---|
| 10 | 9.0 |
| 50 | 9.0 |

Example 5

Three grams of a 1:1 copolymer of ethylene and maleic anhydride were blended with 97.0 grams of high density polyethylene. The procedure described in Example 1 was substantially repeated except that the above polymer was substituted for high density polyethylene and a piece of aluminum 6 in. x 8 in. x 0.012 in. was used. The peel test strength was 43 lbs. per inch width. The lap shear value was 2240 p.s.i.

Example 6

The procedure of Example 1 was substantially repeated except that several other organic acids were substituted for maleic anhydride. The peel strengths are listed in Table II below.

TABLE II

| Organic acid: | Peel strength lbs./in. width |
|---|---|
| Maleic | 11.5 |
| Citraconic | 9.7 |
| Acrylic | 9.1 |
| Polyacrylic | 13.1 |
| Fumaric | 13.0 |
| Itaconic | 6.5 |
| Maleamic | 8.0 |

Example 7

A 6 in. x 8 in. x 0.0045 in. piece of soft annealed pure aluminum foil was cleaned by immersing it in boiling perchloroethylene for about 10 minutes. The cleaning step is not essential to the process but is included as a precaution to ensure a grease-free surface. After cleaning, the aluminum foil was air dried for sufficient time to allow the perchloroethylene to evaporate. This foil was then immersed for 5 minutes in a solution containing 50 g. of $CrO_3$ (chromium trioxide) in 1 liter of water maintained at 80° C. After removing the metal foil from the immersion bath, the excess adhering $CrO_3$ solution was rinsed off with deionized water. The still-wet aluminum foil was immediately immersed for 2 minutes in a maleic acid solution prepared by hydrolyzing 50 g. of maleic anhydride in 1 liter of water. The temperature of the maleic acid immersion bath was about 80° C. After the maleic acid treatment, the aluminum foil was again rinsed with deionized water and allowed to air dry at room temperature. When water was no longer visible on the metal surface, the aluminum was considered sufficiently dry for bonding.

Fifteen grams of high density polyethylene of melt index 3.0 was compression molded into a film sheet in a hydraulic press under a pressure of 110 p.s.i. and at a temperature of 160° C. for 2 minutes. The resulting polymer film was cooled in the press and thereafter removed, said film being approximately 0.01 inch in thickness. This film and the treated aluminum were placed together betwee poly(ethylene terephthalate) slip sheets and bonded in the press under a pressure of 110 p.s.i. and a temperature of 180° C. for 2 minutes. The polyethylene-aluminum laminate thus produced was tested for adhesion according to ASTM test D903–49 except that a cross head separation rate of 4 inches per minute was used and the aluminum foil was peeled from the polymer. The peel strength measured by this test was 20–23 lb. per inch of width.

As noted in connection with Example 1, the peel strength of polyethylene bonded to aluminum foil of the same kind but not treated by this process was only 0.5 lb. per inch of width when measured by the same test.

Example 8

A piece of pure annealed aluminum foil 6 in. x 8 in. x 0.0045 in. was surface treated in the manner described in Example 7. Polypropylene (15 g.) having a melt flow of 4.0 was placed in a hydraulic press under a pressure of 110 p.s.i. at 215° C. for 2 minutes yielding a polymer film about 0.01 inch thick. The film and the treated aluminum foil were placed between poly(ethylene terephthalate) slip sheets and bonded in the hydraulic press under a pressure of 110 p.s.i. and a temperature of 215° C. for 3 minutes. The aluminum-polypropylene laminate produced in this manner had a peel strength of 17.5 lb. per inch of width when tested according to ASTM D903–49 except that a pulling speed of 4 inches per minute was used and the aluminum foil was peeled from the polymer.

Example 9

Several pieces of aluminum were treated according to the process as described in Example 7; polymers listed in Table III were bonded to them. All the polymers listed below, except polypropylene, were bonded to the aluminum according to the process and conditions as described in Example 7. Polypropylene was bonded to aluminum according to the process as described in Example 8. The peel strengths shown in Table III were obtained by testing the bonded samples as described in Example 7.

TABLE III

| Polymer: | Peel strength lbs./in. width |
|---|---|
| High density polyethylene | 22.7 |
| Low density polyethylene | 15.5 |
| Ethylene-propylene rubber (33% ethylene) | 13.0 |
| Ethylene - propylene copolymer (14% ethylene) | 8.1 |
| Poly(butene-1) | 5.0 |
| Polypropylene | 17.5 |

Example 10

Tinplate and nickel were substituted for aluminum as the metal substrate in Example 7. Peel strength for the resulting laminate articles were 21.3 and 12 lbs. per inch width for tinplate and nickel respectively.

Example 11

A sample of aluminum foil similar in dimension to that used in Example 7 was cleaned and surface treated in accordance with the process described in Example 7. High density polyethylene as used in Example 7 was blended with 2.60 percent carbon black on heated rolls at 150° C. for 15 to 20 minutes. This blend was compression molded at 160° C. for 2 minutes under a pressure of 110 p.s.i. in a hydraulic press, yielding a polymer film approximately 0.01 inch thick. This film was placed on the treated aluminum and the resulting assembly placed between poly(ethylene terephthalate) slip sheets and bonded in a hydraulic press at a pressure of 110 p.s.i. and temperature of 190° C. for 2 minutes. After removal from the press the sample was tested for adhesion by the method described in Example 7. The peel strength was 14.0 lbs. per inch of width.

A sample of low density polyethylene having melt index 5.1 was also blended with 2.60 percent carbon black and a polymer film formed under the same conditions as above. The polymer film was bonded as described above to a sample of aluminum foil treated as described in Example 7. The peel strength for this assembly was 7.0 lbs. per inch of width.

The peel strength of carbon black filled polyethylenes when bonded to *untreated* aluminum is essentially zero.

Example 12

Another specimen was evaluated by means of a lap shear test. Two pieces of aluminum 6 in. x 4 in. x 0.063 in. were treated in the manner described in Example 7. A polyethylene film was also prepared as described in Example 7. The two treated aluminum samples were overlapped ½ inch along their 4-inch width with the polyethylene film placed therebetween. The assembly was bonded in a hydraulic press for 2 minutes under a pressure of 60 p.s.i. and a temperature of 200° C. The lapped bond was then tested according to ASTM 1002–53T with an Instron testing machine. The lap shear strength of the adhesive bond was 2860 p.s.i.

Example 13

A laminate sample was prepared according to the procedure described in Example 7. The laminate was placed in boiling water for about 16 hours to test the strength of the adhesive bond under such conditions. Before immersion in the boiling water, the laminate had a peel strength of about 22.5 lbs. per inch width. After 16 hrs. in the boiling water, the peel strength remained the *same*.

Example 14

Example 7 was substantially repeated except that other organic acids identified in Table IV were substituted for maleic acid. The peel strength results are shown in the table.

TABLE IV

| Organic acid: | Peel strength (lbs./in. width) for metal treated with CrO₃ plus organic acid |
|---|---|
| Maleic | 22.7 |
| Citraconic | 21.1 |
| Acrylic | 20.8 |
| Polyacrylic | 24.5 |
| Fumaric | 19.0 |
| Methacrylic | 17.7 |
| Crotonic | 18.4 |
| Glutaric | 19.0 |
| Itaconic | 19.0 |
| Maleamic | 19.0 |

Example 15

A 1:1 copolymer of ethylene and maleic anhydride was blended with high density polyethylene. The procedure of Example 7 was substantially repeated except that the above polymer blend was substituted for high density polyethylene and a piece of aluminum 6 in. x 8 in. x 0.012 in. was used. The weight percent of copolymer blended into the polyethylene is based on the total weight of the blended polymer. The resulting peel strengths are given in Table V below.

TABLE V

| Weight percent copolymer in polyethylene: | Peel strength lbs./in. width |
|---|---|
| 1 | 26 |
| 2 | 35 |
| 3 | 67 |

What is claimed is:

1. In a process of adhering an olefin polymer to a metal substrate, the improvement which comprises treating the metal substrate by contacting with an aqueous solution containing from about 0.1 to about 50 percent by weight of an acid consisting essentially of an aliphatic carboxylic acid as a substantially single treatment for improving the adhesiveness between the metal substrate and the olefin polymer without any further treatment to improve adhesiveness, rinsing the resulting treated metal substrate with water, drying the resulting treated metal substrate, placing a layer of the olefin polymer on the resulting treated metal substrate to form a lay-up, and subjecting the resulting lay-up to heat and pressure.

2. The improvement according to claim 1 wherein the metal substrate is aluminum.

3. The improvement according to claim 1 wherein the aliphatic carboxylic acid is selected from the group consisting of maleic, citraconic, acrylic, polyacrylic, fumaric, methacrylic, crotonic, glutaric, itaconic and maleamic acids.

4. The improvement according to claim 1 wherein the olefin polymer is polyethylene.

5. The improvement according to claim 1 wherein the olefin polymer is a blend of polyethylene and a copolymer of ethylene and maleic anhydride.

6. The improvement according to claim 1 wherein the aliphatic carboxylic acid solution is maintained at temperature of at least about 40° C. during the metal substrate treating step.

7. In a process of adhering an olefin polymer to a metal substrate, the improvement which comprises the successive steps of treating the metal substrate by contacting with an aqueous inorganic acid solution containing hexavalent chromium in concentrations of between about 0.1 and about 50 percent by weight calculated as CrO₃; treating the metal substrate by contacting with an aqueous solution containing between about 0.1 and about 50 percent by weight of an acid consisting essentially of an aliphatic carboxylic acid, both of said treating steps being accomplished in the order stated to improve the adhesiveness between the metal substrate and the olefin polymer without the necessity of further treatment for that purpose; rinsing the resulting treated metal substrate with water; drying the resulting treated metal substrate; placing a layer of the olefin polymer on the resulting treated metal substrate to form a lay-up; and subjecting the resulting lay-up to heat and pressure.

8. The improvement according to claim 7 wherein the inorganic acid solution consists essentially of a solution of chromium trioxide and is maintained at temperture of at least about 40° C. during the metal substrate treating step.

9. The improvement according to claim 7 wherein the aqueous inorganic acid solution containing hexavalent chromium and the aqueous solution containing the aliphatic carboxylic acid are maintained at temperatures of at least about 40° C. during the respective metal treating steps and the aliphatic carboxylic acid is selected from the group consisting of maleic, citraconic, acrylic, polyacrylic, fumaric, methacrylic, crotonic, glutaric, itaconic and maleamic acids.

10. The improvement according to claim 9 wherein the metal substrate is aluminum.

11. The improvement according to claim 9 wherein the olefin polymer is polyethylene.

12. The improvement according to claim 9 wherein the olefin polymer is polypropylene.

13. The improvement according to claim 1 wherein the olefin polymer is polyethylene, the metal substrate is aluminum, the aliphatic carboxylic acid is maleic acid, the aqueous solution is maintained at a temperature above about 40° C., and the resulting lay-up is subjected to temperatures of from 140° to about 210° C. and to pressure sufficient to obtain a strong adhesive bond.

14. The improvement according to claim 7 wherein the olefin polymer is polyethylene, the metal substrate is aluminum, the aliphatic carboxylic acid is maleic acid, the aqueous inorganic acid solution and the aqueous solution containing the maleic acid are each maintained at a temperature above about 40° C., the metal substrate is rinsed with water between the successive treatments, and the resulting lay-up is subjected to temperatures of between about 140° and about 210° C. and to a pressure sufficient to obtain a strong adhesive bond.

References Cited

UNITED STATES PATENTS

| 2,902,390 | 9/1959 | Bell | 117—132 |
| 3,185,596 | 5/1965 | Schiffman | 148—6.16 |
| 3,202,551 | 8/1965 | Gerischer et al. | 148—6.2 |
| 3,231,425 | 1/1966 | Sheratte et al. | 134—41 |

JACOB H. STEINBERG, Primary Examiner

U.S. Cl. X.R.

117—47, 138.8; 148—6.16; 252—79.4